(12) United States Patent
Mochizuki et al.

(10) Patent No.: US 7,849,363 B2
(45) Date of Patent: Dec. 7, 2010

(54) TROUBLESHOOTING SUPPORT DEVICE, TROUBLESHOOTING SUPPORT METHOD AND STORAGE MEDIUM HAVING PROGRAM STORED THEREIN

(75) Inventors: Hiroaki Mochizuki, Yamanashi (JP); Masami Mochizuki, Yamanashi (JP)

(73) Assignee: Tokyo Electron Limited, Tokyo (JP)

(*) Notice: Subject to any disclaimer, the term of this patent is extended or adjusted under 35 U.S.C. 154(b) by 416 days.

(21) Appl. No.: 11/942,284

(22) Filed: Nov. 19, 2007

(65) Prior Publication Data

US 2008/0178042 A1 Jul. 24, 2008

Related U.S. Application Data

(60) Provisional application No. 60/888,245, filed on Feb. 5, 2007.

(30) Foreign Application Priority Data

Dec. 4, 2006 (JP) ............................. 2006-327108

(51) Int. Cl.
*G06F 11/00* (2006.01)
(52) U.S. Cl. .............................. 714/26; 714/46; 714/57
(58) Field of Classification Search ........................ None
See application file for complete search history.

(56) References Cited

U.S. PATENT DOCUMENTS

| | | | |
|---|---|---|---|
| 2002/0050926 A1* | 5/2002 | Lewis et al. ................. | 340/506 |
| 2006/0224265 A1* | 10/2006 | Nakayama et al. .......... | 700/108 |
| 2006/0241803 A1* | 10/2006 | Kitamoto et al. ............ | 700/121 |
| 2009/0055684 A1* | 2/2009 | Jamjoom et al. ............. | 714/26 |

FOREIGN PATENT DOCUMENTS

JP 2003-297710 10/2003

* cited by examiner

*Primary Examiner*—Michael C Maskulinski
(74) *Attorney, Agent, or Firm*—Oblon, Spivak, McClelland, Maier & Neustadt, L.L.P.

(57) ABSTRACT

A troubleshooting support device includes a keyword file storage unit in which keyword files holding keywords constituted with character strings contained in logs related to trouble that occurs in the substrate processing apparatus stored in advance, are stored. A keyword to be used for log search, selected from a keyword file specified based upon input information provided via an input unit, is set and also, a category-specific log file to be used for log analysis is set based upon input information provided via the input unit. Logs in the category-specific log file having been set are extracted and incorporated, and an analysis log file is created by sorting the extracted logs in time sequence. When the logs in the analysis log file are displayed at a display unit, a log containing the keyword having been set is located by searching through the analysis log file and is displayed in a highlighted display.

12 Claims, 14 Drawing Sheets

FIG.4

| TROUBLE TYPE | TROUBLE-RELATED KEYWORD ||||| RECOVERY PROCEDURE CODE |
|---|---|---|---|---|---|
| | ORDER | KEYWORD | LEVEL | COMMENTS | |
| WAFER TRANSFER-RELATED | 1 | LPA Manual Access Disallow | 0 | Likely to be caused by incorrect carrier operation | aaa |
| | 2 | CLEAR | 2 | | bbb |
| WAFER TRANSFER-RELATED | 1 | LPA Manual Access Disallow | 0 | Likely to be caused by incorrect carrier operation | aaa |
| | 2 | CLEAR | 2 | | bbb |
| | 3 | [AGVEQ] Ignore VALID signal | 1 | | |
| | 4 | AGV start function error2 | 0 | | |
| WAFER TRANSFER-RELATED | 1 | Carrier ID read error | 0 | Likely to be caused by error in carrier id read unit | |
| | 2 | 0x01a5400e | 1 | | |
| SYSTEM-RELATED | 1 | jobEsPrsPjStart:sysRcp= [SYSTEM/LPC:P-P1-94P4S-M2] | 1 | Likely to be caused by database management error | |
| | 2 | EC Self-Diagnostic [Task End] | 1 | | |
| ... | | ... | | ..... | |

FIG.5

| RECOVERY PROCEDURE CODE | RECOVERY PROCEDURE |
|---|---|
| aaa | (1) Reset cassette container having been manually disengaged<br>(2) Remove cassette container via automatic transfer device |
| bbb | (1) Reset cassette container having been manually disengaged<br>(2) Switch cassette container access mode to "Cassette Container Manual Replacement Mode"<br>(3) Remove cassette container manually |
| ... | . . . . . . . |

FIG.16

| FILE NAME | DATE/TIME | LOG DATA |
|---|---|---|
| LOGGEN | 2006/07/01 14:18:57 | MMI MsgBox SUB1 Result(1) |
| LOGSYS | 2006/07/01 14:18:57 | sstmain.c:SST_CLOCK_SET_REQ Command |
| LOGALM | 2006/07/01 14:20:33 | LPA Manual Access Disallow |
| LOGGEN | 2006/07/01 14:20:34 | CPF [0018] LPA STATUS EMPTY |
| LOGGEN | 2006/07/01 14:21:03 | MMI Press Button.<Main Menu><Button:9> |
| LOGGEN | 2006/07/01 14:21:03 | MMI Press Button.<Main Menu><Button:TerminalService:9> |
| LOGGEN | 2006/07/01 14:21:04 | MMI Press Button.<Main Menu><Button:10> |
| LOGGEN | 2006/07/01 14:21:04 | MMI Press Button.<Main Menu><Button:Stop Buzzer:10> |
| LOGGEN | 2006/07/01 14:21:06 | MMI Press Button.<Terminal Service><Button:21> |
| LOGGEN | 2006/07/01 14:21:06 | MMI Press Button.<Terminal Service><Button:Accept:21> |
| LOGSYS | 2006/07/01 14:21:06 | 0064 0015:MmiHciTrmSendConfirm() |
| LOGGEN | 2006/07/01 14:21:10 | MMI Press Button.<Terminal Service><Button:23> |
| LOGGEN | 2006/07/01 14:21:10 | MMI Press Button.<Terminal Service><Button:Close:23> |
| LOGGEN | 2006/07/01 14:21:13 | MMI Press Button.<Main Menu><Button:3> |
| LOGGEN | 2006/07/01 14:21:13 | MMI Press Button.<Main Menu><Button:Alarm List:3> |
| LOGGEN | 2006/07/01 14:21:16 | MMI Press Button.<Alarm List><Button:Confirm:1> |
| LOGALM | 2006/07/01 14:21:17 | Clear |
| LOGGEN | 2006/07/01 14:21:17 | MMI MsgBox APL1 Result(1) <msgId :1> |
| LOGGEN | 2006/07/01 14:21:17 | MMI Alarm recovered ( 5000 Verify ) |
| LOGGEN | 2006/07/01 14:21:17 | MMI Press Button. <Alarm List><Button:Confirm:1> |
| LOGSYS | 2006/07/01 14:21:17 | EqcCommand : Alarm Recovery Message Send. ( 5000 ) |
| . . . | . . . . . | . . . . . . . . . . |

TROUBLESHOOTING SUPPORT DEVICE, TROUBLESHOOTING SUPPORT METHOD AND STORAGE MEDIUM HAVING PROGRAM STORED THEREIN

CROSS-REFERENCE TO RELATED APPLICATIONS

This document claims priority to Japanese Patent Application Number 2006-327108, filed on Dec. 4, 2006 and U.S. Provisional Application No. 60/888,245, filed on Feb. 5, 2007, the entire content of which are hereby incorporated by reference.

FIELD OF THE INVENTION

The present invention relates to a troubleshooting support device, a troubleshooting support method and a storage medium having a program stored therein.

BACKGROUND OF THE INVENTION

Semiconductor devices are manufactured by using substrate processing apparatuses that execute specific types of processing such as etching and film formation on semiconductor wafers (hereafter may be simply referred to as "wafers"). Such a substrate processing apparatus includes a processing chamber where wafers are processed, a transfer device that transfers the wafers and a control device that controls various devices disposed in the substrate processing apparatus and executes overall operational control for the substrate processing device, detectors that detect the states of the various devices, and the like.

As the substrate processing apparatus engages in operation, a plurality of types of history information, e.g., output information provided by the individual detectors, drive information indicating how individual units such as the transfer device are being driven, operation information indicating operations performed by the operator, error information, alarm information and program startup information, are recorded as logs constituted with character strings into log files (see, for instance, Japanese Laid Open Patent Publication No. 2003-297710). In the event of trouble (problem) in the substrate processing apparatus, the log files in which the substrate processing apparatus history information is saved are utilized in the investigation of the trouble cause (troubleshooting).

A log file is used for troubleshooting in the related art in the following manner. The operator copies the log file into a hard disk in a troubleshooting device constituted with, for instance, a computer, brings up the logs in the log file on display and clarifies the cause of the trouble based upon a specific log related to the particular trouble, obtained by sifting through the log file in reference to the date/time at which the trouble occurred, the type of trouble and the like. This means that the operator needs to have a fair amount of experience and know-how to be able to find the correct log.

Since a tremendous number of logs are created in the substrate processing apparatus, locating a log related to specific trouble among these logs is bound to be an extremely laborious and time-consuming process. Accordingly, substrate processing apparatuses that create log files each in correspondence to a specific log category have been proposed in recent years on the premise that depending upon the type of trouble, its cause can be clarified without utilizing certain categories of logs. Since only the logs in the log file related to the trouble need to be analyzed, the number of logs to undergo analysis is reduced to lessen the labor of the operator.

However, even when log files are provided each in correspondence to a specific log category, as described above, the work efficiency may still be compromised under the following circumstances. Namely, if a plurality of log files, each having recorded therein logs in time sequence, contain logs related to the trouble, the troubleshooting operation will have to be performed by, for instance, bringing up numerous logs in the individual log files simultaneously, comparing the logs on display and checking chronological relationships among the logs from the various log files. As substrate processing apparatuses have come to fulfill a greater number of functions, an ever increasing number of logs must be recorded in each log file. In short, even if log files are provided each in correspondence to a specific category of log, the time and the labor required for the analysis of the logs in the individual log files cannot be significantly reduced.

In addition, while a log related to the trouble can be searched in a log file with ease based upon a keyword constituted with a specific character string that the target log should contain, the operator working on the troubleshooting task needs to have considerable know-how and experience to be able to determine an effective keyword and search for the correct log successfully. In other words, there is a problem in that an operator lacking such know-how will find it difficult to search for a log related to the particular trouble.

SUMMARY OF THE INVENTION

Accordingly, an object of the present invention, having been completed by addressing the issues discussed above, is to provide a troubleshooting support device and the like, with which a log related to trouble having occurred in a substrate processing apparatus can be automatically searched and brought up as a highlighted display so as to improve the efficiency of the troubleshooting operation and ultimately reduce the length of time required for the troubleshooting operation and the labor that must be expended by the operator.

The object described above is achieved in an aspect of the present invention by providing a troubleshooting support device that supports troubleshooting by analyzing logs created in a substrate processing apparatus that executes a specific type of processing on a processing target substrate in the event of trouble in the substrate processing apparatus, comprising an input unit, a display unit, a log file storage unit in which a plurality of category-specific log files, each having stored therein a specific category of log created in the substrate processing apparatus, are stored, a keyword file storage unit in which a single keyword file or a plurality of keyword files having stored therein keywords constituted with character strings set in advance, each corresponding to a single log or a plurality of logs related to a specific type of trouble that occurs in the substrate processing apparatus, are stored, a keyword setting unit that sets a keyword, to be used for log search, selected from a single keyword file or a plurality of keyword files specified based upon input information provided via the input unit, a category-specific log file setting unit that sets a category-specific log file to be used for log analysis, selected from the category-specific log file storage unit based upon input information provided via the input unit, an analysis log file creation unit that creates an analysis log file by extracting and incorporating logs from the selected category-specific log file and sorting the logs in time sequence and a display control unit that brings up on display the logs in the analysis log file at the display unit, searches the analysis log file for each log containing the keyword having been set and brings up a highlighted display of the log.

According to the present invention described above, the length of time and the labor required to investigate the cause of trouble having occurred in the substrate processing apparatus can be greatly reduced. More specifically, by using the keyword file in which keywords for logs related to trouble that may occur in the substrate processing apparatus are stored in advance, a relevant log among numerous logs can be automatically searched to be brought up in a highlighted display. This means that there is no need to deliberate on which specific logs should be searched in correspondence to the particular trouble and that the need to create a character string for the optimal keyword for the log search is eliminated, thereby assuring better efficiency in the troubleshooting operation. In addition, even if the operator does not know which logs are related to the trouble, the relevant logs are automatically searched to be brought up in a highlighted display, allowing even an inexperienced operator to successfully perform troubleshooting.

In addition, logs in the category-specific log file having been selected to be used for troubleshooting are incorporated and sorted in time sequence in a single analysis log file and each log searched based upon the keyword is brought up in a highlighted display, allowing the operator to verify the log needed for purposes of troubleshooting with ease. Even when a plurality of category-specific log files are selected to be used in the troubleshooting operation, the chronological relationships among the logs in the various category-specific log files can be verified with ease, so as to improve the efficiency of the troubleshooting operation.

In addition, the keyword setting unit may search the keyword storage means for a single keyword file or a plurality of keyword files specified based upon keyword file information input via the input unit and set all the keywords contained in the keyword files obtained through the search as keywords to be used for the log search. In this case, the keywords to be used for the log search can be set with ease simply by setting a specific keyword file.

In the keyword file, a character string indicating a specific type of trouble that occurs in the substrate processing apparatus and a keyword corresponding to a single log or a plurality of logs related to the particular trouble type may be stored in correspondence to each trouble type and the keyword setting unit may search the keyword storage means for a single keyword file or a plurality of keyword files corresponding to a specific type of trouble indicated by a character string matching character string information input via the input unit. The keyword setting unit may then set only a keyword set in relation to the trouble type among the keywords contained in the keyword file obtained through the search as a keyword to be used for the log search. In this case, even when the operator does not know which specific keyword file should be used, the keyword that needs to be used when analyzing the cause of the trouble alone can be set as the keyword to be used for the log search simply by entering the character string indicating the specific trouble type.

The troubleshooting support device may further comprise an extraction range setting unit that sets a range over which logs are to be extracted from each category-specific log file based upon extraction range information input via the input unit and the analysis log file creation unit may extract and incorporate the logs in the extraction range having been set from the category-specific log file having been selected to create an analysis log file by sorting these logs in time sequence. Since the logs within the limited extraction range needed in the troubleshooting operation executed to clarify the cause of trouble having occurred in the substrate processing apparatus can be brought up on display, the efficiency of the troubleshooting operation can be improved.

Each log in a category-specific log file includes date/time information and the extraction range information input via the input unit to be used at the extraction range setting unit defines the extraction range based upon, for instance, specific dates/times. Since the log extraction range can be set in correspondence to specific dates/times, an optimal extraction range can be set based upon the date/time information as long as the date/time at which the trouble occurred in the substrate processing apparatus are known. In this case, logs can be selectively extracted over the range most likely to contain a log related to the trouble.

Furthermore, if a selected keyword file contains a plurality of keywords set in relation to a single type of trouble and also contains information indicating a time-sequence order of various logs containing these keywords, the display control unit may bring up a highlighted display of the searched logs only if the logs containing the keywords appear in an order matching the time-sequence order. In this case, the logs are brought up in a highlighted display at the display unit only if they are sorted in a specific order. In other words, only the relevant logs among numerous logs can be found with ease. As a result, the cause of trouble that results in specific logs recorded in a specific time-sequence order can be clarified with ease.

Also, if information indicating the level of importance of a log containing a specific keyword related to specific trouble is stored in correspondence to each keyword in the keyword file, the display control unit may display the log containing the keyword in one of varying highlighted displays in correspondence to the level of its importance. Since this allows the operator to verify the level of the importance of the log in the highlighted display at a glance, an improvement in the efficiency of the troubleshooting operation is achieved.

Furthermore, if comment information carrying comments on the cause of specific trouble is stored in correspondence to a keyword related to the trouble in the keyword file, the display control unit may display the comment information at the display unit as well. By referring to the comments on display, the operator will be able to investigate the cause of the trouble efficiently.

If recovery procedure information indicating a recovery procedure through which the cause of specific trouble can be eliminated is stored in correspondence to a keyword related to the trouble in the keyword file, the display control unit may display the recovery procedure information at the display unit as well. In this case, the operator will be able to perform the troubleshooting and the subsequent recovery operation with ease.

The object described above is also achieved in another aspect of the present invention by providing a troubleshooting support method for supporting troubleshooting executed by analyzing logs created in a substrate processing apparatus in the event of trouble in the substrate processing apparatus that executes a specific type of processing on a processing target substrate, comprising a keyword setting phase in which a keyword file storage unit having stored therein a single keyword file or a plurality of keyword files with keywords constituted with character strings set in advance each in correspondence to a single log or a plurality of logs related to a specific type of trouble that may occur in the substrate processing apparatus, is searched for a single keyword file or a plurality of keyword files based upon input information provided via an input unit and a keyword to be used for log search, selected from a keyword file obtained through the search, is set, a category-specific log file setting phase in which a category-specific log file to be used in log analysis, selected based upon input information provided via the input unit from a log file storage unit having stored therein a plurality of category-specific log files each holding a specific category of log created in the substrate processing apparatus is set, an analysis log file creation phase in which logs are extracted from the category-specific log file having been set, incorporated and sorted in time sequence, thereby creating an analysis log file, and a display control phase in which the logs in the analysis log file are brought up on display at a display unit and each log containing the keyword having been set is located for a highlighted display by searching the analysis log file. By adopting the troubleshooting support method according to the present invention described above, the length of time and the labor required for the investigation of the cause of trouble in the substrate processing apparatus can be greatly reduced.

The object described above is further achieved in yet another aspect of the present invention by providing a computer-readable recording medium having recorded therein a program for supporting troubleshooting executed by analyzing logs created in a substrate processing apparatus that executes a specific type of processing on a processing target substrate enabling a computer to execute a keyword setting step in which a keyword file storage unit having stored therein a single keyword file or a plurality of keyword files with keywords constituted with character strings set in advance each in correspondence to a single log or a plurality of logs related to a specific type of trouble that may occur in the substrate processing apparatus, is searched for a single keyword file or a plurality of keyword files based upon input information provided via an input unit and a keyword to be used for log search, selected from a keyword file obtained through the search, is set, a category-specific log file setting step in which a category-specific log file setting phase in which a category-specific log file to be used in log analysis, selected based upon input information provided via the input unit from a log file storage unit having stored therein a plurality of category-specific log files each holding a specific category of log created in the substrate processing apparatus is set, an analysis log file creation step in which logs are extracted from the category-specific log file having been set, incorporated and sorted in time sequence, thereby creating an analysis log file and a display control step in which the logs in the analysis log file are brought up on display at a display unit and each log containing the keyword having been set is located for a highlighted display by searching the analysis log file.

According to the present invention, an improvement in the efficiency of investigation of the cause of trouble having occurred in the substrate processing apparatus is achieved and, as a result, the length of time and the labor required for the troubleshooting operation are greatly reduced. In addition, an operator lacking know-how and experience is able to perform troubleshooting.

BRIEF DESCRIPTION OF THE DRAWINGS

FIG. 4 presents an example of a keyword file structure that may be adopted in the embodiment;

FIG. 5 presents an example of a recovery procedure file structure that may be adopted in the embodiment;

FIG. 16 presents a specific example of the log display results provided in the log display field.

DETAILED DESCRIPTION OF THE PREFERRED EMBODIMENT

Figure 1:
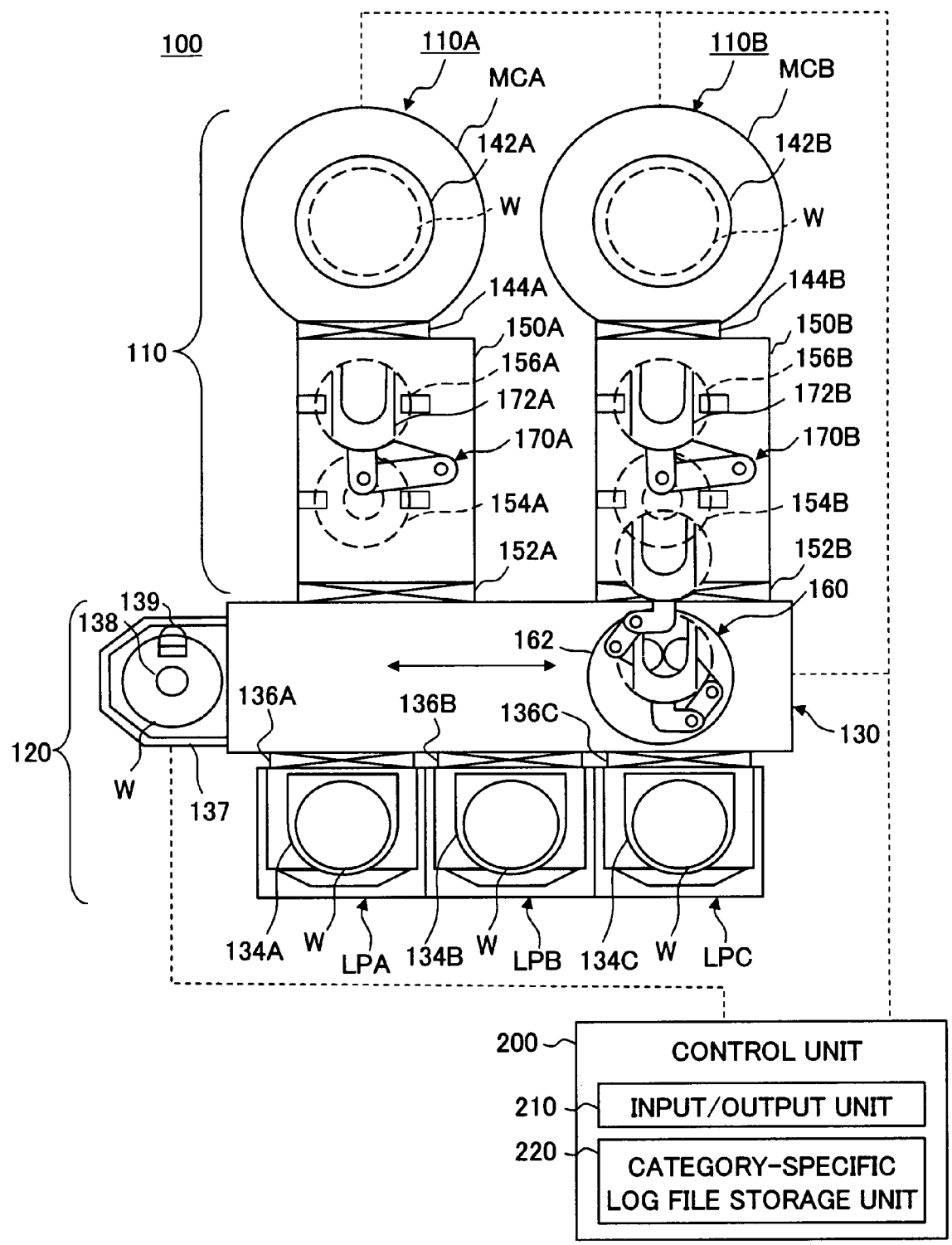
FIG. 1 is a sectional view of a specific example of a substrate processing apparatus for which the troubleshooting operation is executed.

The following is a detailed explanation of a preferred embodiment of the present invention, given in reference to the attached drawings. It is to be noted that in the description and the drawings, the same reference numerals are assigned to components having substantially identical functions and structural features to preclude the necessity for a repeated explanation thereof.

Structural Example for Substrate Processing Apparatus

First, a specific example that may be adopted in the substrate processing apparatus for which the troubleshooting operation is executed according to the present invention is explained in reference to a drawing. The substrate processing apparatus in this example includes at least one vacuum processing unit connected to a transfer chamber. FIG. 1 is a sectional view schematically illustrating the structure of the substrate processing apparatus achieved in the embodiment.

The substrate processing apparatus 100 includes either a single vacuum processing unit 110 or a plurality of vacuum processing units 110 where any of various types of processing, such as etching, is executed on a processing target substrate, e.g., a semiconductor wafer (hereafter may be simply referred to as a "wafer") W, and a transfer unit 120 that transfers the wafer W into/out of each vacuum processing unit 110. The transfer unit 120 includes a common transfer chamber 130 used to transfer wafers W.

In the example presented in FIG. 1, two vacuum processing units 110A and 110B are disposed along a side surface of the transfer unit 120. The vacuum processing units 110A and 110B respectively include processing chambers MCA and MCB and evacuatable load-lock chambers 150A and 150B disposed continuous to the processing chambers. In the processing chambers MCA and MCB of the vacuum processing units 110A and 110B, a single type of processing such as etching is executed on wafers W.

The processing chambers MCA and MCB both assume a structure that allows them to function as plasma processing devices with high-frequency power applied to electrodes disposed therein to function as wafer stages 142A and 142B and a processing gas delivered into the processing chambers MCA and MCB raised to plasma to enable a plasma etching process to be executed on wafer surfaces. It is to be noted that the processing chambers may adopt a structure other that than described above. In addition, while an explanation is provided above on an example in which the substrate processing apparatus includes two vacuum processing units each equipped with a processing chamber, as shown in FIG. 1, the present invention is not limited to this example and may be adopted in a substrate processing apparatus with three or more vacuum processing units each equipped with a processing chamber.

The transfer chamber 130 at the transfer unit 120 is formed as a box with a substantially rectangular section, where an inert gas such as $N_2$ gas or clean air is circulated. A plurality of load ports LPA through LPC are disposed at one of the side surfaces of the transfer chamber 130 ranging along the longer side of the substantially rectangular section. The load ports LPA through LPC function as processing target substrate standby ports, at which cassette containers 134A through 134C are placed. While FIG. 1 shows three cassette containers 134A through 134C each placed on one of the load ports LPA through LPC, the numbers of the cassette tables and cassette containers are not limited to this example and there may be one or two cassette tables and cassette containers, or there may be four or more cassette tables and cassette containers.

At each of the cassette containers 134A through 134C, up to 25 wafers W, for instance, can be stored in multiple racks with equal pitches. The cassette containers assume a sealed structure with, for instance, an $N_2$ gas atmosphere filling the space therein. Wafers W can be carried into/out of the transfer chamber 130 via gate valves 136A through 136C.

A common transfer mechanism (atmospheric pressure-side transfer mechanism) 160 that transfers a wafer W along the length (along the direction indicated by the arrow in FIG. 1) thereof is disposed inside the transfer chamber 130. The common transfer mechanism 160 is fixed onto, for instance, a base 162 and the base 162 is allowed to slide on a guide rail (not shown) disposed over the central area of the transfer chamber 130 so as to extend along the length thereof via, for instance, a linear motor drive mechanism. The common transfer mechanism 160 may be a double-arm mechanism equipped with two end-effectors, as shown in FIG. 1, or it may be a single-arm mechanism equipped with a single end-effector.

At the other side surface of the transfer chamber ranging along the longer side of the substantially rectangular section, the base ends of the two load-lock chambers 150A and 150B are connected via switchable gate valves (atmospheric pressure-side gate valves) 152A and 152B. The front ends of the load-lock chambers 150A and 150B are respectively connected to the processing chambers MCA and MCB via switchable gate valves (vacuum pressure-side gate valves) 144A and 144B.

In the load-lock chambers 150A and 150B, a pair of buffer stages 154A and 156A and a pair of buffer stages 154B and 156B, on which wafers W are temporarily held in standby, are respectively disposed. In the explanation, the buffer stages 154A and 154B disposed closer to the transfer chamber are referred to as first buffer stages, whereas the buffer stages 156A and 156B disposed on the other side are referred to as second buffer stages. Individual transfer mechanisms (vacuum pressure-side transfer mechanisms) 170A and 170B, each constituted with an articulated arm capable of flexing, rotating and moving up/down, are disposed respectively between the buffer stages 154A and 156A and between the buffer stages 154B and 156B.

At the front ends of the individual transfer mechanisms 170A and 170B, end-effectors 172A and 172B are respectively disposed, so that wafers W can be transferred between the first and second buffer stages 154A and 156A and between the first and second buffer stages 154B and 156B via the end-effectors 172A and 172B respectively. It is to be noted that wafers are carried from the load-lock chambers 150A and 150B to the processing chambers MCA and MCB and vice versa via the respective individual transfer mechanisms 170A and 170B.

At an end of the transfer chamber 130, i.e., at one side surface ranging along the shorter side of the substantially rectangular section, an orienter (a pre-alignment stage) 137 to function as a wafer positioning device is disposed. The orienter 137 includes, for instance, a rotary stage 138 and an optical sensor 139 which optically detects the peripheral edge of a wafer W, both installed as built-in units, and aligns the wafer W by detecting an orientation flat, a notch or the like formed therein.

The various units constituting the substrate processing apparatus, including the processing chambers MCA and MCB, the orienter 137 and the transfer mechanisms 160 and 170 are controlled based upon control signals provided by a control unit 200. The control unit 200 executes wafer processing by controlling the various units based upon a specific program.

The control unit 200 includes an input/output unit 210, by which various types of data are input/output in response to an operator operation, and a category-specific log file storage unit 220, in which logs created as the substrate processing apparatus 100 engages in operation, sorted into specific categories (e.g., in correspondence to purpose of use), are stored in a plurality of category-specific log files. In addition, the control unit 200 includes various controllers (not shown) used to control the individual units constituting the substrate processing apparatus 100. The various controllers include controllers engaged in control of various components in the individual processing chambers MCA and MCB as well as the controllers used to control the common transfer mechanism 160, the individual transfer mechanisms 170A and 170B and the orienter 137. It is to be noted that the various components in each of the processing chambers MCA and MCB may instead be controlled by a dedicated control unit provided in conjunction with each of the processing chambers MCA and MCB. In such a case, the control unit 200 should be connected with the individual control units serving the respective processing chambers MCA and MCB so as to control the substrate processing apparatus 100 by exchanging data and signals.

The input/output unit 210 is constituted with an input unit such as a keyboard, a mouse or a touch panel, a display unit constituted with a display at which various types of information are displayed as an output, a drive device that reads data from and writes data into a recording medium, which may be a Floppy® disk or a CD-ROM, and the like.

Figure 2:
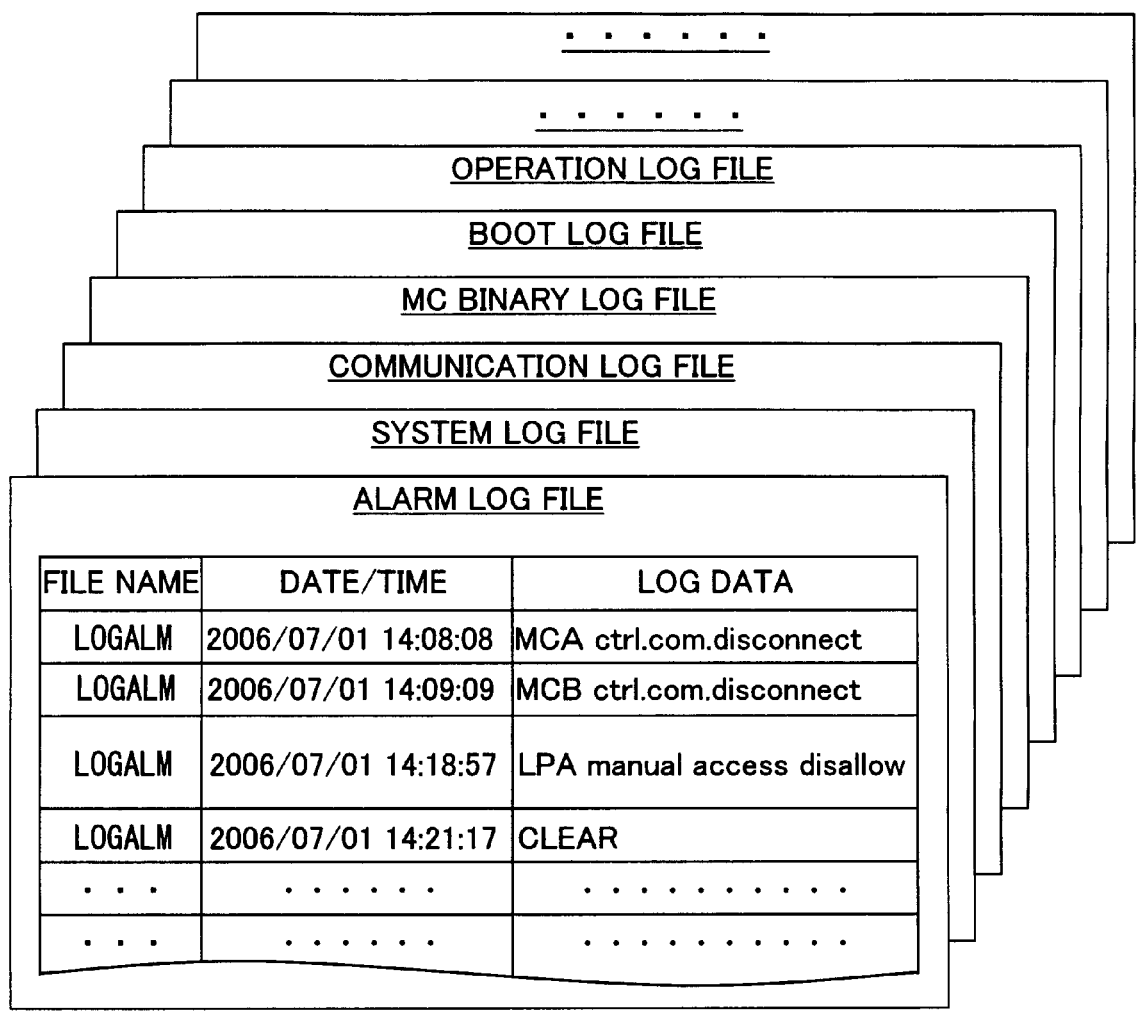
FIG. 2 presents specific examples of category-specific log files.

In the category-specific log file storage unit 220, a plurality of category-specific log files, each holding logs in a specific category (sorted in correspondence to a specific purpose of use), are stored as shown in FIG. 2. A plurality of logs created as the substrate processing apparatus 100 engages in operation are stored in each category-specific log file. Such category-specific log files may include an alarm log file, a system log file, a communication log file, an MC binary log file, a boot log file and an operation log file.

An alarm log is created in order to store alarm information when an alarm has been issued in the substrate processing apparatus 100. A system log is created in order to store information related to a system error or system internal information when a system error has occurred or system internal information has been generated. In the communication log file, communication data (including various types of messages) exchanged with a host apparatus (not shown) connected to the substrate processing apparatus 100, for instance, are stored. In the MC binary log file, drive information with regard to the drive of the mechanical units, such as the transfer mechanisms, in the substrate processing apparatus 100 is stored. In the boot log file, information with regard to program startups and shutdowns occurring in the substrate processing apparatus 100 is stored. In the operation log file, details of an operation performed via an operation screen at the substrate processing apparatus 100 are stored as an operation log. These logs each include, at least, the filename, the date/time and log data information providing the log contents, as shown in FIG. 2.

It is to be noted that the category-specific log file storage unit described above does not need to be installed in the control unit 200 and instead, it may be installed in a data processing apparatus (e.g., an AGC (advanced group controller)), constituted with a data processing computer connected to the control unit 200 via a network. In such a case, the control unit 200 transmits logs having been created in the substrate processing apparatus 100 to the data processing apparatus via the network, and the data processing apparatus stores the logs into the category-specific log file storage unit installed in its storage unit constituted with a hard disk or the like. The data processing apparatus should include a drive device capable of reading data from/writing data into a recording medium such as a Floppy® disk or a CD-ROM, and is thus able to save logs stored in the category-specific log file storage unit into the recording medium.

This data processing apparatus may assume functions that enable it to execute analysis processing and statistical processing on process data or the like, centralized monitoring processing on process data or analysis/statistical processing results obtained by analyzing/statistically processing the process data, processing through which recipes are updated based upon the analysis/statistical processing results and the like, in addition to the log storage function described above. The data processing apparatus may be constituted with a single computer or it may be constituted with a plurality of computers. In addition, some of the functions listed above may be fulfilled at a server and the rest of the functions may be fulfilled at a client. It is to be noted that the data processing apparatus may be allowed to function as the troubleshooting support device to be detailed later.

Structural Example for the Troubleshooting Support Device

Figure 3:
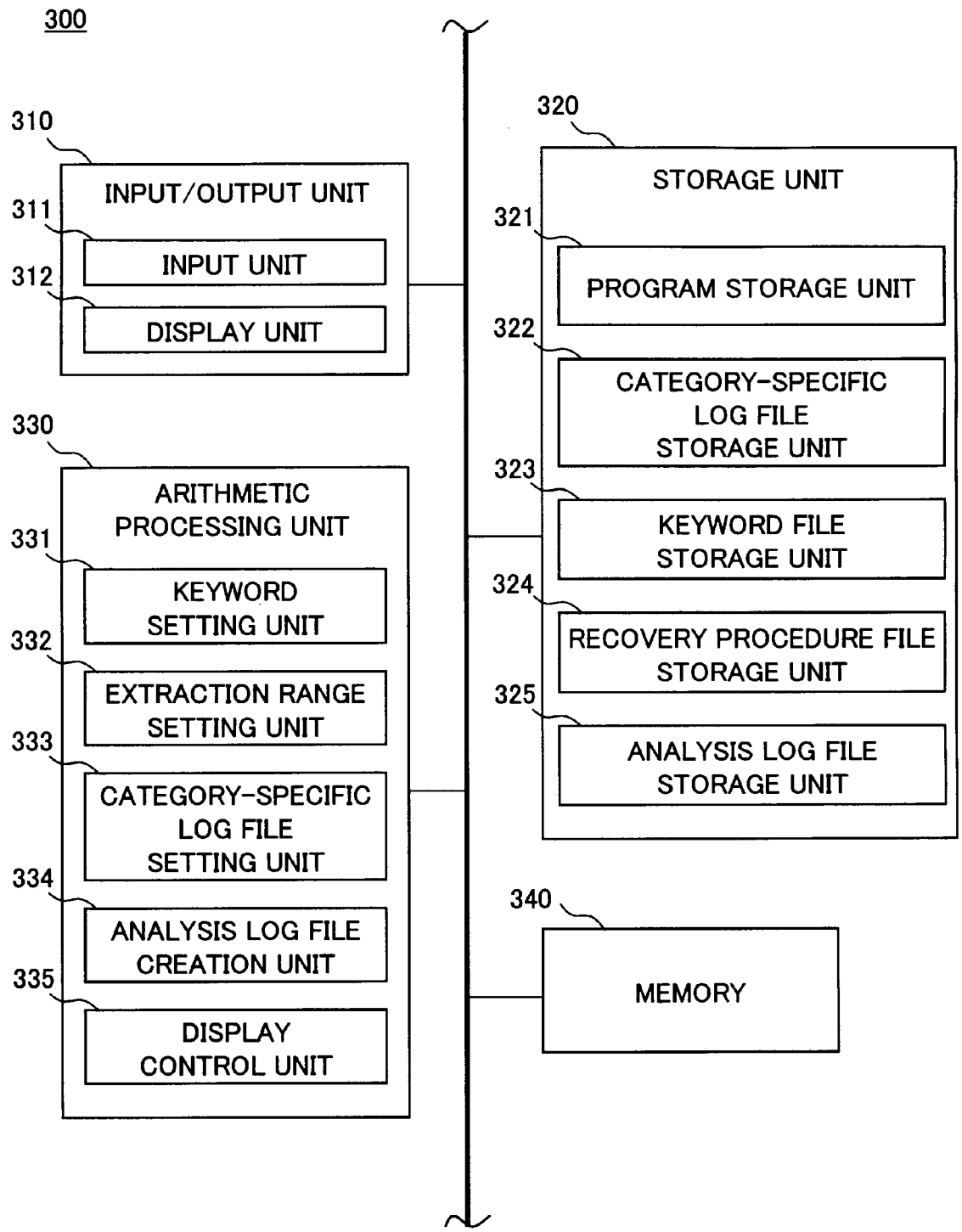
FIG. 3 is a block diagram of the structure adopted in the troubleshooting support device achieved in an embodiment of the present invention.

Next, a structural example that may be adopted in the troubleshooting support device according to the present invention is explained in reference to drawings. FIG. 3 is a block diagram showing a structure that may be adopted in the troubleshooting support device achieved in the embodiment. As shown in FIG. 3, the troubleshooting support device 300 includes an input/output unit 310 by which data are entered by the operator and data are output for display or the like in response to an operator operation, a storage unit 320 in which data and the like to be used when an arithmetic processing unit 330 executes arithmetic processing are stored, the arithmetic processing unit 330 that executes various types of arithmetic processing and a memory 340 that temporarily holds the results of arithmetic operations executed by the arithmetic processing unit 330.

The input/output unit 310 is constituted with an input unit 311 such as a keyboard, a mouse or a touch panel and a display unit 312 constituted with a display at which various types of information are displayed as an output. It is to be noted that the input output unit 310 also includes a drive device (not shown), that reads data from and writes data into a recording medium, which may be a Floppy® disk or a CD-ROM, and the like.

The storage unit 320 constituted with, for instance, a hard disk, includes a program storage unit 321 in which programs such as a program used when executing troubleshooting support processing is executed, are stored and storage units in which files and data to be used when executing the troubleshooting support processing are stored. More specifically, it includes, for instance, a category-specific log file storage unit 322, a keyword file storage unit 323, a recovery procedure file storage unit 324 and an analysis log file storage unit 325 in addition to the program storage unit 321.

In the category-specific log file storage unit 322, a plurality of category-specific log files holding logs having been created in the substrate processing apparatus 100 are stored. More specifically, category-specific log files such as those shown in FIG. 2 having been collected in the category-specific log file storage unit 220 of the control unit 200 at the substrate processing apparatus 100 (or in the category-specific log file storage unit of the data processing apparatus connected to the control unit 200 via the network), taken in via a recording medium such as a Floppy® disk or a CD-ROM, are stored into the category-specific log file storage unit 322.

It is to be noted that the present invention is not limited to the example described above and if the control unit 200 of the substrate processing apparatus 100 is connected with the troubleshooting support device 300 via a network, the troubleshooting support device 300 may store category-specific log files received from the control unit 200 via the network into its category-specific log file storage unit 322. In addition, if the category-specific logs are collected by the data processing apparatus connected to the network, the troubleshooting support device 300 may store category-specific log files received from the data processing apparatus via the network into its category-specific log file storage unit 322.

In addition, in order to utilize the storage area in the category-specific log file storage unit 322 more efficiently, the category-specific log files may be stored in a compressed format and a particular category-specific log file may be decompressed for use as necessary.

In the keyword file storage unit 323, a keyword file holding at least one keyword that should be contained in logs related to a specific type of trouble that may occur in the substrate processing apparatus 100. The keyword file contains information indicating the trouble type and a keyword related to the particular type of trouble, as shown in FIG. 4. The trouble-related keyword information may include the keyword, a keyword level, comments and a recovery procedure code, as shown in FIG. 4.

A keyword is constituted with a character string contained in a log and is used to identify the log in correspondence to the character string alone. For instance, part of the log characterizing the log may be selectively used as a keyword. The keyword level indicates the level of importance of a log containing the particular keyword and may assume a value "0", "1", "2" . . . in the order of importance. For instance, "0" may indicate an error, "1" may indicate a warning and "2" may indicate information.

It is to be noted that if a plurality of keywords are set in relation to a single type of trouble, information indicating the time-sequence order with which logs containing the keywords should appear may be stored. By storing the combination of the keywords appearing in the specific time-sequence order as described above, the relevant logs can be found more easily when, for instance, the cause of trouble is indicated accurately only if logs containing the keywords appear in a specific order.

In the comment field, a likely cause of trouble, to which a log containing a specific keyword is related, is stored. However, the contents of the comments are not limited to this example and, for instance, description of a log identified in correspondence to the keyword may be stored as comments. A recovery procedure code stored in a recovery procedure file to be detailed later is indicated in the recovery procedure code field.

It is to be noted that the types of information carried in the keyword file are not limited to those shown in FIG. 4 and as long as keywords are stored in correspondence to individual types of trouble, information describing the specific trouble types does not need to be included in the keyword file. In addition, keyword files may be created each corresponding to a given type of trouble.

A keyword file is created based upon, for instance, keywords contained in the logs having been used in a troubleshooting operation for trouble having occurred previously in the substrate processing apparatus 100, comments and the recovery procedures corresponding to the past trouble and the like. Thus, if trouble similar to past trouble occurs, its cause can be investigated quickly by using the data such as the keywords based upon which the cause of the past trouble was investigated in the embodiment. It is desirable that the log keywords used for log analysis, comments, the recovery procedure and the like be accumulated into the relevant keyword file each time the cause of trouble in the substrate processing apparatus 100 is investigated.

A recovery procedure file indicating recovery procedures to be followed to restore the substrate processing apparatus 100 having experienced trouble is stored in the recovery procedure file storage unit 324. The recovery procedure file holds information indicating recovery procedure codes and recovery procedures as shown in FIG. 5. In the analysis log file storage unit 325, an analysis log file created through troubleshooting support processing is stored.

The arithmetic processing unit 330, constituted with, for instance, a CPU (central processing unit) and the like, executes the troubleshooting support processing achieved in the embodiment based upon a specific program. As the arithmetic processing unit 330 executes a troubleshooting support program stored in the program storage unit 321, it functions as various processing units participating in the execution of the troubleshooting support processing. More specifically, the arithmetic processing unit 330 is capable of functioning as a keyword setting unit 331, an extraction range setting unit 332, a category-specific log file setting unit 333, an analysis log file creation unit 334 and a display control unit 335.

The keyword setting unit 331 sets a trouble-related keyword to be used for log search, selected from a single keyword file or a plurality of keyword files specified based upon input information provided via the input unit 311. The extraction range setting unit 332 sets the range over which logs are to be extracted from a target category-specific log file based upon input information provided via the input unit 311. Based upon input information provided via the input unit 311, the category-specific log file setting unit 333 selects a target category-specific log file to be used for log analysis among the category-specific log files in the category-specific log file storage unit 322. The analysis log file creation unit 334 extracts and incorporates the logs from the selected category-specific log file and creates an analysis log file by sorting the logs in time sequence. The display control unit 335 displays the logs in the analysis log file at the display unit 312, searches the analysis log file for each log containing the selected trouble-related keyword and displays the log obtained through the search in a highlighted display.

(Troubleshooting Support Processing)

Figure 6:
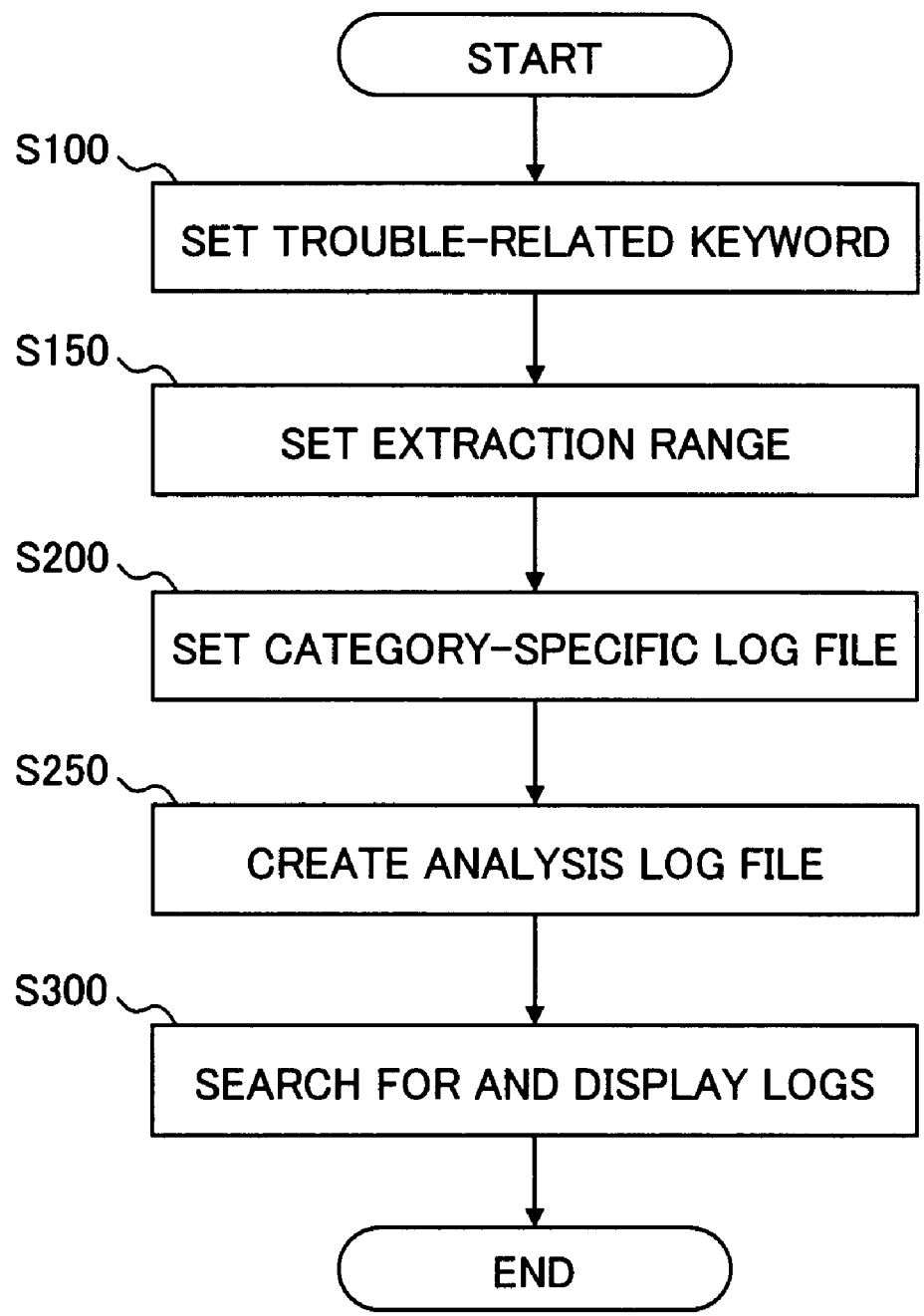
FIG. 6 presents a flowchart of a specific example of the troubleshooting support processing executed in the embodiment of the present invention.

Next, the troubleshooting support processing executed by the troubleshooting support device is explained in reference to drawings. FIG. 6 presents a flowchart of a specific example of the troubleshooting support processing. Based upon the troubleshooting support program, the arithmetic processing unit 330, functioning as the keyword setting unit 331, the extraction range setting unit 332, the category-specific log file setting unit 333, the analysis log file creation unit 334 and the display control unit 335, executes the troubleshooting support processing with necessary data read out from the storage unit 320 with specific timing.

Figure 7:
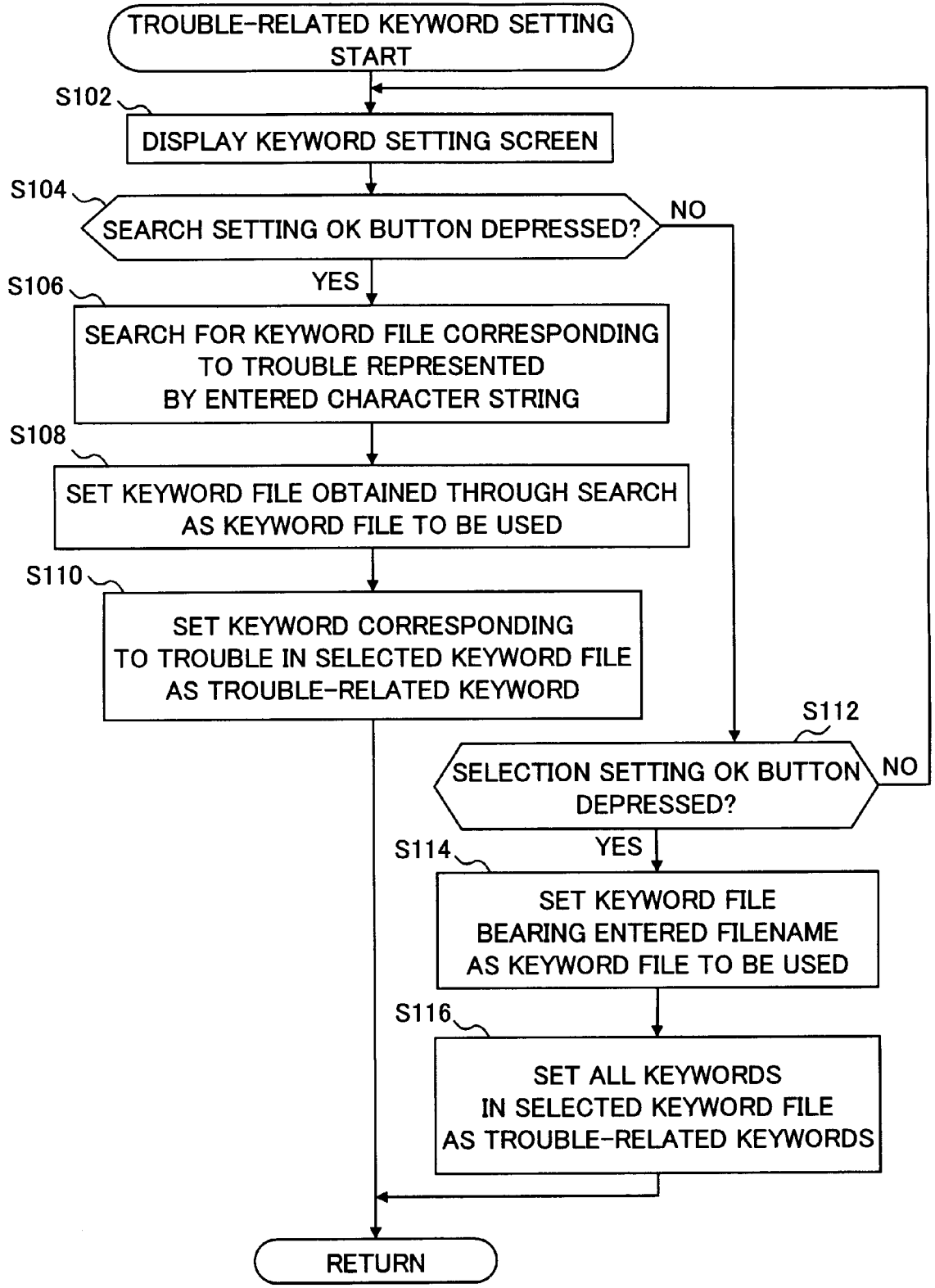
FIG. 7 presents a flowchart of a specific example of the trouble-related keyword setting processing in FIG. 6.

First, in step S100, a trouble-related keyword is set (keyword setting phase, keyword setting step). The trouble-related keyword may be set through, for instance, the procedure shown in the flowchart in FIG. 7. First, a keyword setting screen is brought up on display at the display unit 312 in step S102.

Figure 12:
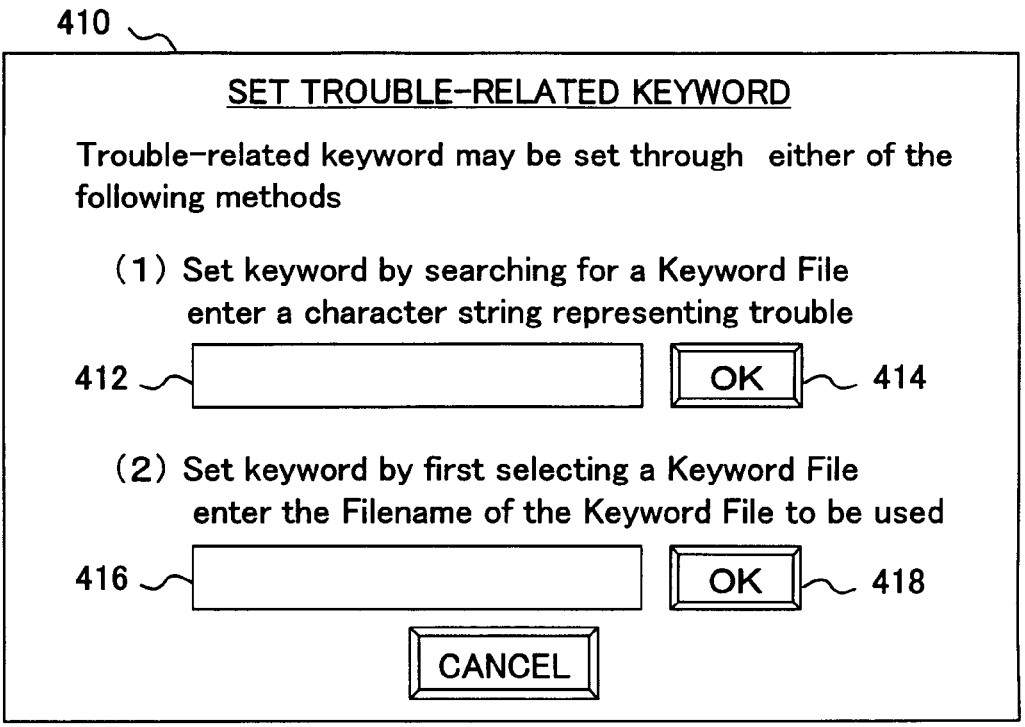
FIG. 12 presents a specific example of the keyword setting screen.

A keyword setting screen 410 such as that shown in FIG. 12 is brought up on display at the display unit 312 at this time. In this example, the trouble-related keyword may be set through either of two different methods. In the first setting method (1), the trouble-related keyword is set by searching for a keyword file. More specifically, over the area corresponding to (1) in the keyword setting screen 410, an entry field 412, where a character string representing the trouble is entered via the input unit 311 such as a keyboard and an OK button 414 by which the entry is confirmed, are displayed. This method may be adopted when, for instance, the specific keyword file that should be used is not known in advance, so as to set the trouble-related keyword by automatically searching for the keyword file to be used in correspondence to part of the character string or the entire character string indicating the trouble. In this case, even when the operator does not know which keyword file should be used, he only needs to enter a character string indicating the trouble type in the entry field 412 to set the specific keyword needed when analyzing the trouble cause as the keyword to be used for the log search. As a result, even an operator lacking know-how and experience is able to investigate the trouble cause with ease.

In the second setting method (2), the trouble-related keyword is set by selecting a specific keyword file. Over the area corresponding to (2) in the keyword setting screen 410 shown in FIG. 12, an entry field 416, where a keyword file name is entered via the input unit 311 such as a keyboard, and an OK button 418 by which the entry is confirmed, are displayed. This method may be adopted when, for instance, the operator already knows which keyword file to use so as to set the trouble-related keyword by directly selecting the keyword file. In this case, the keyword to be used for the log search can be set very easily simply by setting the keyword file.

It is to be noted that another window may open as the input field 416 is specified via a mouse pointer, a cursor, a finger or a touch pen to display a list of eligible keyword files so as to allow the operator to select the specific keyword file to be used from the list. In addition to the buttons described above, a CANCEL button such as that shown in FIG. 12 may be displayed in the keyword setting screen 410. The troubleshooting support processing may end in response to, for instance, selecting the CANCEL button.

If the OK button 414 displayed over the area corresponding to the search setting (1) in the keyword setting screen 410 is selected, the processing in steps S104 through S110 is executed. Namely, if it is decided in step S104 that the OK button 414 over the area corresponding to the search setting (1) has been selected, a search for the keyword file corresponding to the trouble represented by the character string entered in the input field 412 in area (1) is executed in step S106. More specifically, the keyword file storage unit 323 is searched for the keyword file corresponding to the particular trouble. It is to be noted that if no keyword file corresponding to the trouble can be obtained through the search, a message indicating the failure to locate the keyword file may be brought up on display at the display unit 312.

The keyword file having been thus located is set as the keyword file to be used in step S108 and a keyword related to the particular trouble, contained in the keyword file, is set as the trouble-related keyword in step S110.

If the OK button 418 displayed over the area corresponding to the selection setting (2) in the keyword setting screen shown in FIG. 12 is selected, the processing in steps S112 through S116 is executed. Namely, if it is decided in step S112 that the OK button 418 over the area corresponding to the selection setting (2) has been selected, the keyword file bearing the file name entered in the entry field 416 is set as the keyword file to be used in step S114. In this case, all the keywords contained in the keyword file are set as trouble-related keywords in step S116.

Figure 8:
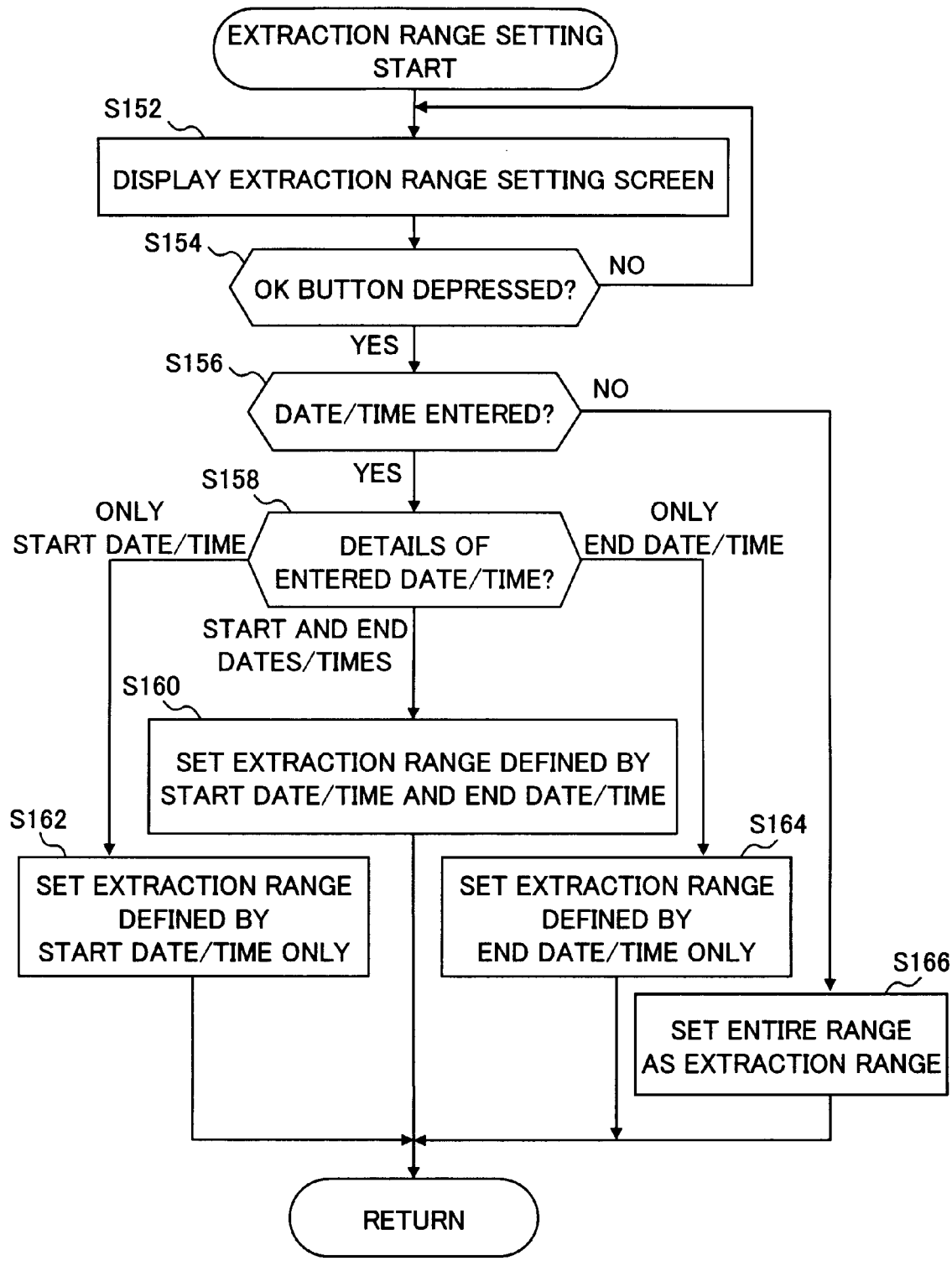
FIG. 8 presents a flowchart of a specific example of the extraction range setting processing in FIG. 6.

Once the trouble-related keyword is set in step S110 or step S116, the log extraction range is set in step S150 in FIG. 6 (extraction range setting phase, extraction range setting step). Since a great number of logs are created, it is crucial to be able to look for relevant logs by setting the smallest possible extraction range. The extraction range may be set through the procedure shown in the flowchart presented in FIG. 8. First, and extraction range setting screen is brought up on display at the display unit 312 in step S152.

Figure 13:
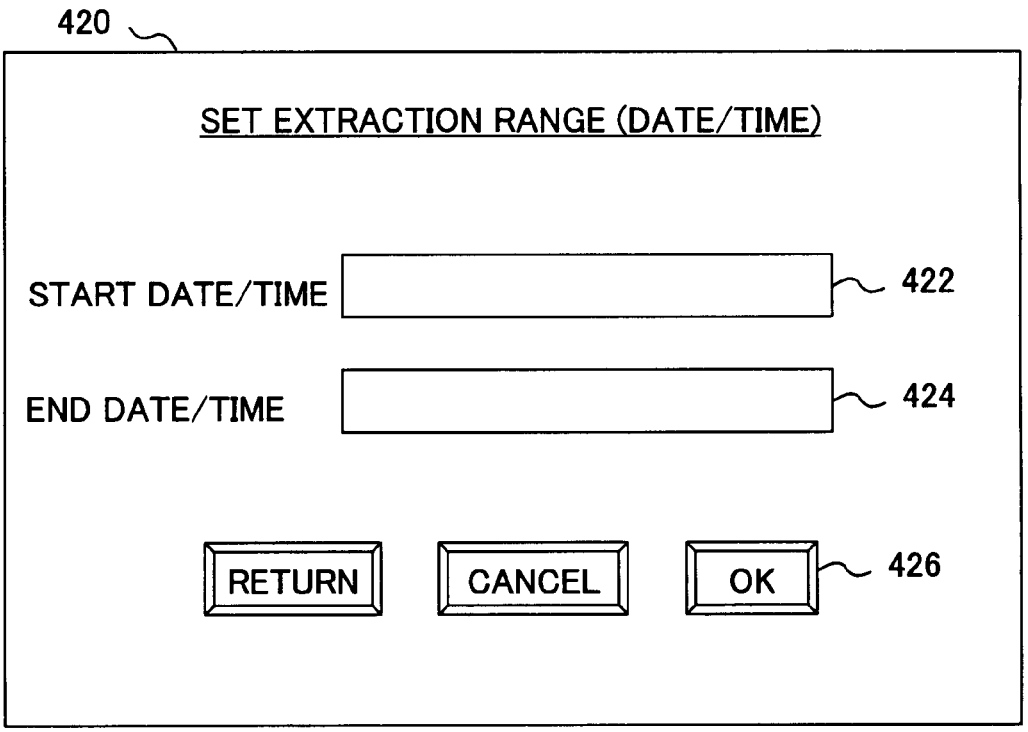
FIG. 13 presents a specific example of the extraction range setting screen.

At this time, an extraction range setting screen 420 such as that shown in FIG. 13 is brought up on display at the display unit 312. In this example, the extraction range can be set by indicating specific dates/times, since it is highly likely that the logs relevant to the cause of the trouble are located in a time range containing the dates/times at which the trouble occurred. More specifically, a start date/time entry field 422, in which the start date/time is entered via the input unit 311 such as a keyboard, an end date/time entry field 424, in which the end date/time is entered via the input unit 311 such as a keyboard and an OK button 426 to be selected to confirm the entries are displayed in the extraction range setting screen 420.

It is to be noted that in addition to the OK button, a return button, a CANCEL button and the like may be displayed in the extraction range setting screen 420, as shown in FIG. 13. If the return button is selected, the display may be switched back to the keyword setting screen 410 shown in FIG. 12, whereas if the CANCEL button is selected, the troubleshooting support processing may end.

If the OK button 426 is selected in the extraction range setting screen 420, the processing in steps S154 through S166 is executed. Namely, if it is decided in step S154 that the OK button 426 in the extraction range setting screen 420 has been selected, a decision is made in step S156 as to whether or not the end date/time entry field 422 or the end date/time entry field 424 contains a date/time entry. If it is decided that a date/time has been entered, a decision is made in step S158 to ascertain that entries have been made in both the start date/time entry field 422 and the end date/time entry field 424, that an entry has been made only in the start date/time entry field 422 or that an entry has been made only in the end date/time entry field 424.

If it is decided in step S158 that entries have been made in both the start date/time entry field 422 and in the end date/time entry field 424, the range defined by the start date/time and the end date/time having been entered is set as the log extraction range in step S160. If, on the other hand, it is decided in step S158 that an entry has been made only in the start date/time entry field 422, a range defined by the start date/time alone is set as the extraction range in step S162. If it is decided in step S158 that an entry has been made only in the end date/time entry field 424, a range defined only by the end date/time is set as the extraction range in step S164. It is to be noted that if it is decided in step S156 that no entry has been made in the start date/time entry field 422 or in the end date/time entry field 424, the entire range of logs is set as the extraction range. Through the measures described above, logs over the specific extraction range relevant to the investigation of the cause of the trouble having occurred in the substrate processing apparatus 100 alone can be brought up on display so as to improve the efficiency of the troubleshooting operation. In addition, since the log extraction range can be set by specifying dates/times, the extraction range can be set based upon, for instance, the date/time at which the trouble occurred in the substrate processing apparatus 100. As a result, the logs can be extracted over the range that is most likely to contain trouble-related logs.

Figure 9:
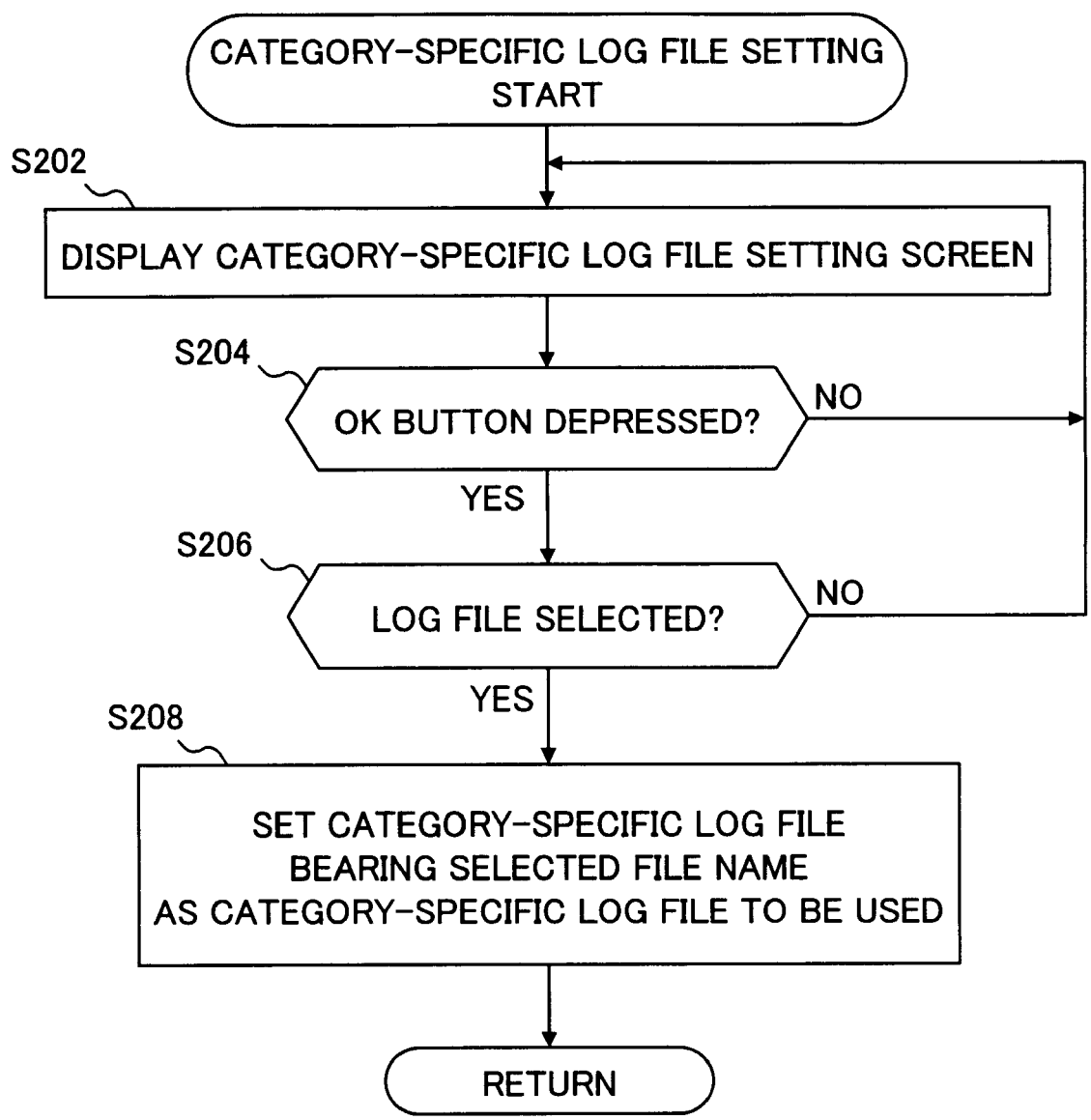
FIG. 9 presents a flowchart of a specific example of the category-specific log file setting processing in FIG. 6.

Once the extraction range is set as described above, a category-specific log file to be used is set in step S200 in FIG. 6 (category-specific log file setting phase, category-specific log file setting step). Since a plurality of category-specific log files are stored in the category-specific log file storage unit 322, a category-specific log file among these files is selected and set to be used for the troubleshooting operation so as to locate the relevant logs from the smallest possible range of logs instead of searching through a very large number of logs created in the substrate processing apparatus. The category-specific log file may be set through the procedure shown in the flowchart presented in FIG. 9. First, a category-specific log file setting screen is brought up on display in step S202.

Figure 14:
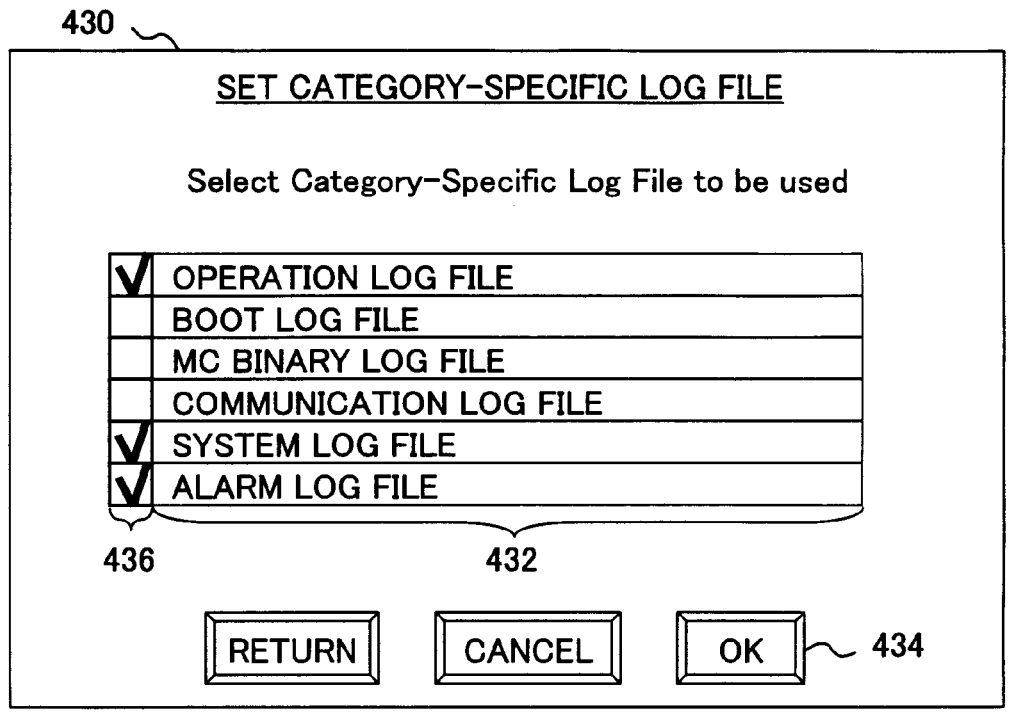
FIG. 14 presents a specific example of the category-specific log file setting screen.

A category-specific log file setting screen 430 such as that shown in FIG. 14 allows a plurality of category-specific log files to be set. More specifically, in the category-specific log file setting screen 430 in FIG. 14, a display field 432 over which the file names of eligible category-specific log files are displayed and an OK button 434 by which a selected file name is confirmed are displayed. For instance, the display field 432 may include checking fields 436 provided each in correspondence to one of the file names, so as to allow the operator to specify the file name of the file he wishes to select by checking the corresponding checking field 436 with a mouse pointer, a cursor, a finger or a touch pen. It is to be noted that another window may open to display the file names of the category-specific log files to allow the operator to make a selection.

It is to be noted that in addition to the OK button, a return button, a CANCEL button and the like may be displayed in the category-specific log file setting screen 430, as shown in FIG. 14. If the return button is selected, the display may be switched back to the extraction range setting screen 420 shown in FIG. 13, whereas if the CANCEL button is selected, the troubleshooting support processing may end.

If the OK button 434 is selected in the category-specific log file setting screen 430 shown in FIG. 14, the processing in steps S204 through S210 is executed. Namely, if it is decided in step S204 that the OK button 434 has been selected, a decision is made in step S206 as to whether or not a log file has been selected. If it is decided in step S206 that no log file has been selected, the operation returns to step S202, whereas if it is decided in step S206 that a log file has been selected, the category-specific log file bearing the selected file name is set as the category-specific log file to be used for log analysis in step S208.

Figure 10:
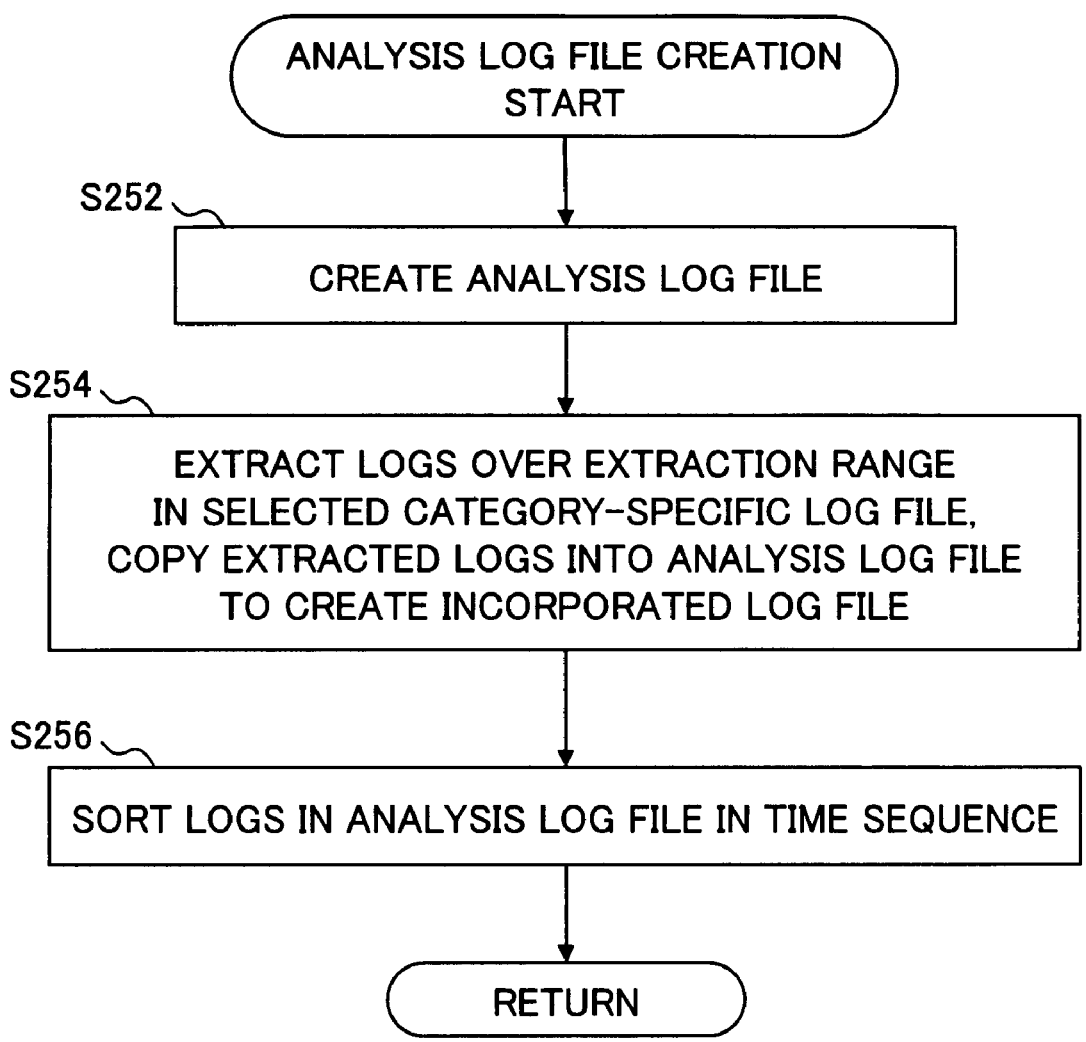
FIG. 10 presents a flowchart of a specific example of the analysis log file creation processing in FIG. 6.

Upon completing the category-specific log file setting, an analysis log file is created in step S250 shown in FIG. 6 (analysis log file creation phase, analysis log file creation step). The analysis log file is created to be used by the operator performing trouble analysis. The analysis log file may be created through the procedure shown in the flowchart presented in FIG. 10. First, in step S252, a new analysis log file is created in the analysis log file storage unit 325. Then, in step S254, the logs in the extraction range having been selected are extracted from the category-specific log file having been set, the extracted logs are copied into the analysis log file and thus an analysis log file is created by incorporating the extracted logs. Next, in step S256, the logs in the analysis log file are sorted in time sequence.

Figure 11:
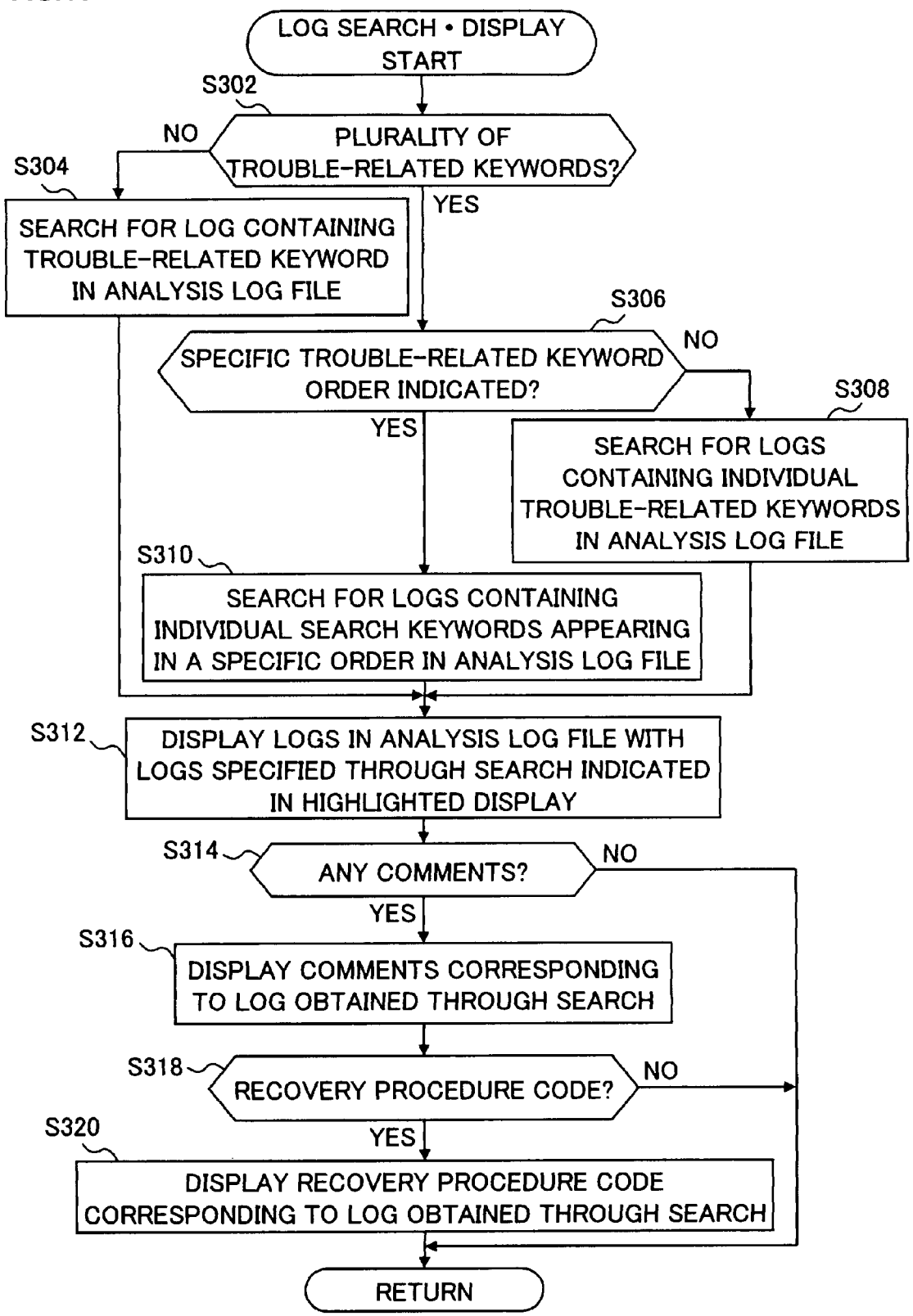
FIG. 11 presents a flowchart of a specific example of the log search display processing in FIG. 6.

Once the analysis log file is created, log search/display processing is executed by using the analysis log file in step S300 (display control phase, display control step). The log search/display may be executed through the procedure shown in the flowchart presented in FIG. 11. First, in step S302, a decision is made as to whether a single trouble-related keyword or a plurality of trouble-related keywords have been set. If it is decided in step S302 that a single trouble-related keyword has been set, the analysis log file is searched for any log containing the particular trouble-related keyword in step S304.

If, on the other hand, it is decided in step S302 that a plurality of trouble-related keywords have been set, a decision is made in step S306 as to whether or not a specific order has been indicated with regard to the trouble-related keywords. If it is decided in step S306 that no specific trouble-related keyword order has been indicated, the analysis log file is searched for logs containing the individual trouble-related keywords in step S308. If, on the other hand, it is decided in step S306 that a specific trouble-related keyword order has been indicated, the analysis log file is searched for logs containing the trouble-related keywords appearing in the specified order in step S310. In this case, only the logs appearing in the specified order are brought up in a highlighted display at the display unit 312 and thus, the relevant logs among a great number of logs can be located with ease. As a result, the cause of trouble recorded in logs appearing in a specific time-sequence order can easily be investigated.

Next, the logs in the analysis log file are brought up on display at the display unit 312 with the logs specified through the search indicated in the highlighted display in step S312. The highlighted display may be provided as, for instance, an inverse display, a hatched display, an enlarged character display or a highlight display. As a result, all the logs in the analysis file are displayed in a log display field 442 in an analysis log display screen 440 such as that shown in FIG. 15, with the logs specified through the search indicated in a highlighted display. Since this allows a target log among a very large number of logs to be found with ease, the troubleshooting operation is facilitated. While specific file names, dates/times and log data are not indicated in the log display field 442 in the analysis log display screen 440 shown in FIG. 15, the file names of the files holding the individual logs, the corresponding dates/times, the corresponding log data are in fact displayed in time sequence in a list format, as shown in FIG. 16. It is to be noted that the logs on display in the log display field 442 can be scrolled in the analysis log display screen 440 shown in FIG. 15.

It is to be noted that the logs may be displayed with varying levels of emphasis in correspondence to the levels of importance of the keywords stored in the keyword file. In this case, since the logs are displayed with varying levels of emphasis in correspondence to the level of importance of the keywords they contain, the operator is able to ascertain the level of importance of a given log based upon the level of emphasis with which it is displayed. As a result, the efficiency of the troubleshooting operation is improved.

Next, if it is decided in step S314 that there are comments stored in relation to a trouble-related keyword having been selected, the comments related to a log having been located through the search, too, are brought up on display in step S316. For instance, comments describing a likely cause of trouble may be displayed in a comment display field 444 in FIG. 15. In this case, the operator is able to perform log analysis and, at the same time, efficiently investigate the cause of trouble by referring to the comments on display. Alternatively, comments describing the individual logs may be displayed in a comment field included in the log display field 442.

Then, if it is decided in step S318 that there is a recovery procedure code set in relation to a trouble-related keyword having been set, the recovery procedure code corresponding to a log having been located through the search, too, is displayed in step S320. Such a recovery procedure code may be displayed in a recovery procedure display field 446 in FIG. 15. As a result, the subsequent recovery operation, as well as the troubleshooting, can be performed with ease. It is to be noted that if there are two or more recovery procedure options, all the recovery procedures may be displayed or a single representative recovery procedure may be displayed.

More specifically, recovery procedure codes aaa and bbb in FIG. 5 indicate recovery procedures that may be followed to correct the trouble caused by an incorrect carrier operation, as shown in FIG. 4, and the trouble cause can be eliminated through either recovery procedure. Accordingly, the recovery procedure corresponding to both the recovery procedure code aaa and the recovery procedure code bbb may be displayed in the recovery procedure display field 446 in FIG. 15 or only the recovery procedure corresponding to the recovery procedure code aaa may be displayed as a representative recovery procedure in the recovery procedure display field. In the latter case, the recovery procedure corresponding to the recovery procedure code aaa may be displayed together with information indicating that there is an alternative recovery procedure and the recovery procedure code, e.g., bbb of the alternative recovery procedure. It is to be noted that another window may open to display the recovery procedure corresponding to the recovery procedure code.

Figure 15:
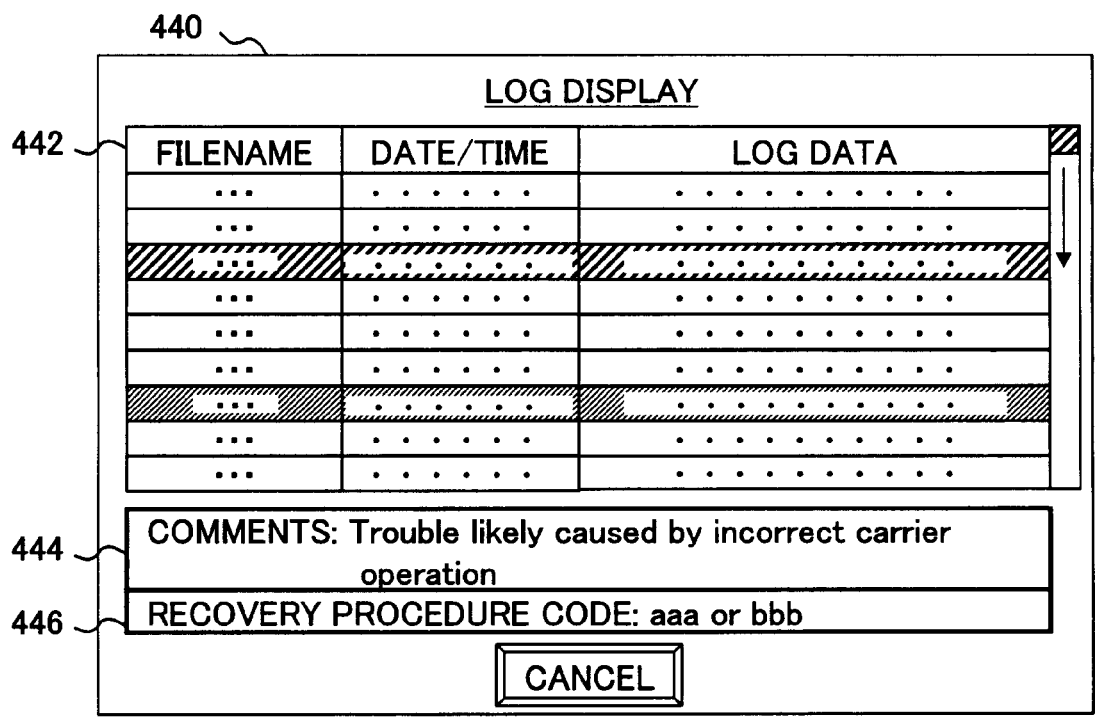
FIG. 15 presents a specific example of the analysis log display screen.

It is to be noted that in addition to the display fields described above, a CANCEL button or the like may be displayed in the analysis log file display screen 440 as shown in FIG. 15. In response to a choosing the CANCEL button, the troubleshooting support processing may end. With the analysis log display screen 440 up on display, the operator investigates the trouble cause based upon the logs indicated in the highlighted display and the other logs displayed at the display unit 312.

In reference to FIG. 16, a specific example of results of log display provided in the log display field 442 in the analysis log display field 440 is described. The log display results presented in FIG. 16 include a list of logs from a plurality of category-specific log files sorted in time sequence, with the logs containing keywords indicated in a highlighted display. In this example, "LPA manual access disallow" and "clear" have been set as keywords and, accordingly, only logs containing these keywords are displayed in the highlighted display.

The log display results presented in FIG. 16 show the log containing the character string "LPA manual access disallow" in a highlighted display. This log was created when the cassette container set at the load port LPA was manually disengaged although the auto transfer mode for disengaging the cassette container via the transfer robot had been selected. A "verify" log subsequently created indicates that an alarm requiring the operator to eliminate the trouble cause was verified. In other words, the cause of the trouble has not been eliminated yet.

The trouble in this case was caused by the manual disengagement of the cassette container, which should have been disengaged by the transfer robot in the auto transfer mode. Accordingly, this trouble can be corrected to restore the substrate processing apparatus 100 through the corresponding recovery procedure by (1) resetting the cassette container having been disengaged manually and then (2) removing the cassette container via the automatic transfer device.

As described above, a search is executed automatically to locate each relevant logs among the huge number of logs and then the relevant log having been located can be brought up on display in a highlighted display by using the keyword file that includes keywords for logs related to trouble that may occur in the substrate processing apparatus 100 stored in advance. More specifically, by using the keyword file in which keywords for logs related to trouble that may occur in the substrate processing apparatus are stored in advance, a relevant log among numerous logs can be automatically searched to be brought up in a highlighted display. This means that there is no need to deliberate on which specific logs should be searched in correspondence to the particular trouble and that the need to create a character string for the optimal keyword for the log search is eliminated, thereby assuring better efficiency in the troubleshooting operation, which, in turn, greatly reduces the length of time and the labor required to investigate the cause of trouble having occurred in the substrate processing apparatus 100. In addition, even if the operator does not know which logs are related to the trouble, each relevant log is automatically located to be brought up in a highlighted display, allowing even an inexperienced operator to successfully perform troubleshooting.

Furthermore, logs in the category-specific log file having been selected to be used for troubleshooting are extracted and sorted in time sequence in a single analysis log file and each log searched based upon the keyword is brought up in a highlighted display, allowing the operator to verify the log needed for purposes of troubleshooting with ease. Even when a plurality of category-specific log files are selected to be used in the troubleshooting, the chronological relationships among the logs in the various category-specific log files can be verified with ease, so as to improve the efficiency of the troubleshooting operation, which, in turn, greatly reduces the length of time and the labor required to investigate the cause of trouble having occurred in the substrate processing apparatus 100.

It is to be noted that the present invention having been described in detail in reference to the embodiment may be adopted in a system constituted with a plurality of devices or in an apparatus constituted with a single device. Furthermore, it is obvious that the present invention may be achieved by providing a system or an apparatus with a medium such as a storage medium having stored therein a software program enabling the functions of the embodiment and by reading out and executing the program stored in the medium at the computer (or a CPU or an MPU) in the system or the apparatus.

In such a case, the program itself read out from the medium such as a storage medium embodies the functions of the embodiment described above and the medium such as a storage medium having the program stored therein embodies the present invention. The medium such as a storage medium through which the program is provided may be, for instance, a Floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, magnetic tape, a nonvolatile memory card, or a ROM. Moreover, such a program may be downloaded into the medium via a network.

It is to be noted that the scope of the present invention includes an application in which an OS or the like operating on the computer executes the actual processing in part or in whole in response to the instructions in the program read out by the computer and the functions of the embodiment are achieved through the processing thus executed, as well as an application in which the functions of the embodiment are achieved as the computer executes the program it has read out.

The scope of the present invention further includes an application in which the program read out from the medium such as a storage medium is first written into a memory in a function expansion board loaded in the computer or a function expansion unit connected to the computer, a CPU or the like in the function expansion board or the function expansion unit executes the actual processing in part or in whole in response to the instructions in the program and the functions of the embodiment described above are achieved through the processing.

While the invention has been particularly shown and described with respect to a preferred embodiment thereof by referring to the attached drawings, the present invention is not limited to this example and it will be understood by those skilled in the art that various changes in form and detail may be made therein without departing from the spirit, scope and teaching of the invention.

For instance, while an explanation is given above in reference to the embodiment on an example in which the present invention is adopted in a tandem-type substrate processing apparatus, with a plurality of processing units, each constituted by connecting a load-lock chamber to a processing chamber, connected in parallel to the transfer unit, the present invention is not limited to this example and it may be adopted in a cluster tool-type substrate processing apparatus with a plurality of processing chambers in a processing unit connected around a common transfer chamber. The present invention may be further adopted in any of various types of substrate processing apparatus is in which logs are stored. For instance, it may be adopted in a film formation apparatus such as a plasma CVD apparatus, a sputtering apparatus and a thermal oxidizing apparatus, as well as in a plasma etching apparatus. In addition, the present invention may be adopted in substrate processing apparatuses that process processing target substrates other than wafers, e.g., FPDs (flat panel displays) and mask reticles for photomasks, or it may be adopted in MEMS (micro-electromechanical system) manufacturing apparatuses.

What is claimed is:

1. A troubleshooting support device that supports troubleshooting by analyzing logs created in a substrate processing apparatus that executes a specific type of processing on a processing target substrate in the event of trouble in said substrate processing apparatus, comprising:
    an input unit;
    a display unit;
    a log file storage unit in which a plurality of category-specific log files, each having stored therein a specific category of log created in said substrate processing apparatus, are stored;
    a keyword file storage unit in which a single keyword file or a plurality of keyword files having stored therein keywords constituted with character strings set in advance, each corresponding to a single log or a plurality of logs related to trouble that occurs in said substrate processing apparatus, are stored;
    a keyword setting unit that sets a keyword to be used for log search, selected from a single keyword file or a plurality of keyword files specified based upon input information provided via said input unit;
    a category-specific log file setting unit that sets a category-specific log file to be used for log analysis, selected from said category-specific log file storage unit based upon input information provided via said input unit;
    an analysis log file creation unit that creates an analysis log file by extracting and incorporating logs from the selected category-specific log file and sorting said logs in time sequence; and
    a display control unit that brings up on display said logs in said analysis log file at the display unit, searches said analysis log file for each log containing said keyword having been set and brings up a highlighted display of said log, wherein:
    said keyword setting unit searches said keyword file storage unit for a single keyword file or a plurality of keyword files specified based upon keyword file information input via said input unit and sets all said keywords contained in each keyword file obtained through the search as keywords to be used for log search.

2. A troubleshooting support device according to claim 1, wherein:
    in each keyword file, a character string indicating a specific type of trouble that occurs in said substrate processing apparatus and a keyword corresponding to a single log or a plurality of logs related to the particular trouble type is stored in correspondence to each trouble type; and
    said keyword setting unit searches said keyword file storage unit for a single keyword file or a plurality of keyword files each corresponding to a specific type of trouble indicated by a character string matching character string information input via said input unit and then sets only a keyword set in relation to the trouble type among said keywords contained in said keyword file obtained through the search as a keyword to be used for log search.

3. A troubleshooting support device according to claim 1, further comprising:
    an extraction range setting unit that sets a range over which logs are to be extracted from each category-specific log file based upon extraction range information input via said input unit, wherein:
    said analysis log file creation unit extracts and incorporates said logs in said extraction range having been set from said category-specific log file having been selected to create an analysis log file by sorting the logs in time sequence.

4. A troubleshooting support device according to claim 3, wherein:
    each log in said category-specific log files includes date/time information; and
    said extraction range information input via said input unit to be used at said extraction range setting unit defines said extraction range based upon, for instance, specific dates/times.

5. A troubleshooting support device according to claim 1, wherein:
    if a selected keyword file contains a plurality of keywords set in relation to a single type of trouble and also contains information indicating a time-sequence order of various logs containing said keywords, said display control unit brings up a highlighted display of logs located through search only if said logs containing said keywords appear in an order matching said time-sequence order.

6. A troubleshooting support device according to claim 1, wherein:
    if information indicating the level of importance of a log containing a specific keyword related to specific trouble is stored together with or in correspondence to said keyword in each keyword file, said display control unit displays said log containing said keyword in one of varying highlighted displays in correspondence to a level of its importance.

7. A troubleshooting support device according to claim 1, wherein:
    if comment information carrying comments on a cause of specific trouble is stored in correspondence to a keyword related to the trouble in each keyword file, said display control unit displays said comment information at the display units as well.

8. A troubleshooting support device according to claim 1, wherein:
    if recovery procedure information indicating a recovery procedure through which a cause of specific trouble can be eliminated is stored in correspondence to a keyword related to the trouble in each keyword file, said display control unit displays said recovery procedure information at said display unit as well.

9. A troubleshooting support method for supporting troubleshooting executed by analyzing logs created in a substrate processing apparatus that executes a specific type of processing on a processing target substrate in the event of trouble in said substrate processing apparatus, comprising:
    a keyword setting phase in which a keyword file storage unit having stored therein a single keyword file or a plurality of keyword files with keyword constituted with character string set in advance, each corresponding to a single log or a plurality of logs related to a specific type of trouble that occurs in said substrate processing apparatus is searched for a single keyword file or a plurality of keyword files based upon input information provided via an input unit and a keyword to be used for log search, selected from a keyword file obtained through the search, is set;
    a category-specific log file setting phase in which a category-specific log file to be used in log analysis, selected based upon input information provided via said input unit from a log file storage unit having stored therein a plurality of category-specific log files each holding a specific category of log created in said substrate processing apparatus, is set;

an analysis log file creation phase in which logs are extracted from said category-specific log file having been set, incorporated and sorted in time sequence, thereby creating an analysis log file; and a display control phase in which said logs in said analysis log file are brought up on display at a display unit and each log containing said keyword having been set is obtained for a highlighted display by searching said analysis log file, wherein said keyword setting phase searches said keyword file storage unit for a single keyword file or a plurality of keyword files specified based upon keyword file information input via said input unit and sets all said keywords contained in each keyword file obtained through the search as keywords to be used for log search.

10. A troubleshooting support method according to claim 9, wherein:

in each keyword file, a character string indicating a specific type of trouble that occurs in said substrate processing apparatus and a keyword corresponding to a single log or a plurality of logs related to the particular trouble type is stored in correspondence to each trouble type; and said keyword setting phase searches said keyword file storage unit for a single keyword file or a plurality of keyword files each corresponding to a specific type of trouble indicated by a character string matching character string information input via said input unit and then sets only a keyword set in relation to the trouble type among said keywords contained in said keyword file obtained through the search as a keyword to be used for log search.

11. A computer-readable recording medium having recorded therein a program for supporting troubleshooting executed by analyzing logs created in a substrate processing apparatus that executes a specific type of processing on a processing target substrate in the event of trouble in said substrate processing apparatus, enabling a computer to execute:

a keyword setting step in which a keyword file storage unit having stored therein a single keyword file or a plurality of keyword files with keyword constituted with character string set in advance, each corresponding to a single log or a plurality of logs related to a specific type of trouble that occurs in said substrate processing apparatus is searched for a single keyword file or a plurality of keyword files based upon input information provided via an input unit and a keyword to be used for log search, selected from a keyword file obtained through the search, is set;

a category-specific log file setting step in which a category-specific log file to be used in log analysis, selected based upon input information provided via said input unit from a log file storage unit having stored therein a plurality of category-specific log files each holding a specific category of log created in said substrate processing apparatus, is set;

an analysis log file creation step in which logs are extracted from said category-specific log file having been set, incorporated and sorted in time sequence, thereby creating an analysis log file; and a display control step in which said logs in said analysis log file are brought up on display at a display unit and each log containing said keyword having been set is obtained for a highlighted display by searching said analysis log file, wherein said keyword setting step searches said keyword file storage unit for a single keyword file or a plurality of keyword files specified based upon keyword file information input via said input unit and sets all said keywords contained in each keyword file obtained through the search as keywords to be used for log search.

12. A computer-readable recording medium according to claim 11, wherein:

in each keyword file, a character string indicating a specific type of trouble that occurs in said substrate processing apparatus and a keyword corresponding to a single log or a plurality of logs related to the particular trouble type is stored in correspondence to each trouble type; and said keyword setting step searches said keyword file storage unit for a single keyword file or a plurality of keyword files each corresponding to a specific type of trouble indicated by a character string matching character string information input via said input unit and then sets only a keyword set in relation to the trouble type among said keywords contained in said keyword file obtained through the search as a keyword to be used for log search.

* * * * *